United States Patent [19]

Perry

[11] 4,046,119
[45] Sept. 6, 1977

[54] WATER VAPOR INJECTION SYSTEM FOR INTERNAL COMBUSTION ENGINES

[76] Inventor: Frank Perry, 3295 W. 4th Ave., Hialeah, Fla. 33012

[21] Appl. No.: 650,363

[22] Filed: Jan. 19, 1976

[51] Int. Cl.² ............... F02M 25/06; F02M 17/22; F02B 77/05
[52] U.S. Cl. .................. 123/119 A; 123/25 R; 123/25 D; 123/25 E; 123/134; 123/198 A
[58] Field of Search .............. 123/198 A, 134, 25 R, 123/119 A, 25 B, 25 D, 25 E, 25 F, 25 J, 25 P

[56] References Cited

U.S. PATENT DOCUMENTS

| | | | |
|---|---|---|---|
| 1,325,381 | 12/1919 | Silver | 123/198 A |
| 1,529,351 | 3/1925 | Grooms | 123/25 R |
| 1,594,616 | 8/1926 | Hefferman | 123/119 A |
| 2,099,802 | 11/1937 | Ewing | 123/119 A |
| 3,139,873 | 7/1964 | Gardner | 123/119 A |
| 3,141,447 | 7/1964 | Jernigan | 123/119 A X |
| 3,530,842 | 9/1970 | vonBrimer | 123/198 A |
| 3,875,922 | 8/1975 | Kirnss, Jr. | 123/198 A |

*Primary Examiner*—Wendell E. Burns

[57] ABSTRACT

Apparatus for injecting controlled amounts of water vapor into an internal combustion engine includes a water receptacle and conduit connecting the receptacle at a level above the water level therein to the intake manifold of the engine. An air inlet is also provided in the receptacle and a conduit extends from the air inlet into the receptacle below the water level. A third conduit bleeds exhaust gas from the exhaust system into the water receptacle to influence the rate at which water vapor is withdrawn from the water receptacle and conducted to the intake manifold such that at increased engine outputs the rate of water vapor injection is increased whereas at lower engine outputs the rate of water vapor injection is decreased.

3 Claims, 3 Drawing Figures

WATER VAPOR INJECTION SYSTEM FOR INTERNAL COMBUSTION ENGINES

BACKGROUND OF THE INVENTION

The present invention relates to apparatus for injecting water vapor into an internal combustion engine and more particularly to such apparatus as will automatically increase the rate of water vapor injection with increased engine output and decrease the rate of water vapor injection with decreased engine output.

Various systems for water injection of internal combustion engines have been known heretofore since it was previously recognized that water injection is useful in connection with controlling air pollution, increasing engine efficiency so as to decrease fuel consumption, and in enabling the engine to operate with a reduced accumulation of carbon deposits, sludge, germs and the like.

Typical of one prior system is the moisturizer disclosed in U.S. Pat. No. 3,141,447 issued July 21, 1964 to P.S. Jernigan wherein water is withdrawn from a water supply reservoir and is conducted to the carburetor of the engine for introduction of the water in vapor form into the intake manifold. However, the water is mixed with hot exhaust gases prior to introduction into the carburetor and this can have an adverse effect upon the mixing ratio of the carburetor which maight necessitate frequent carburetor adjustment.

Another prior system is disclosed in U.S. Pat. No. 1,317,362 issued Sept. 30, 1919 to A.A. Friestedt. In this patent a receptacle for liquid is connected to the intake manifold of an internal combustion engine so as to conduct water vapor from the receptacle to the intake manifold. The patentee also provided for an arrangement whereby the air supply to the receptacle was controlled in order to cut off such supply until a predetermined engine speed had been attained. However, in accordance with this system there was substantially no water injection at low engine speeds since the air supply was shut off.

SUMMARY OF THE INVENTION

It is one object of this invention to provide apparatus for injecting water vapor into an internal combustion engine which is operative at all engine speeds and which has no adverse effect upon the airfuel ratio in the carburetor.

It is another object of this invention to provide apparatus for injecting water vapor into an internal combustion engine which includes simple means for automatically adjusting the rate of water vapor injection in accordance with changes in engine speed.

Other objects and advantages of the invention will become readily apparent from the following description of the invention.

According to the present invention there is provided apparatus for injecting controlled amounts of water vapor into an internal combustion engine comprising in combination:

an internal combustion engine including an intake manifold for the introduction of a combustible gaseous mixture into the cylinders of the engine and an exhaust system for the discharge of combusted gases from the engine;

a receptacle for storing a supply of liquid water in fixed relation to the engine;

an air inlet in the upper portion of the water receptacle and first conduit means connected thereto adapted to discharge air at a lower level within the receptacle;

an outlet for water vapor in the upper portion of the water receptacle and second conduit means connected at one end thereto and at the other end of the intake manifold for withdrawing water vapor from the receptacle and conducting same to the intake manifold by virtue of the suction forces created in the intake manifold;

and third conduit means connected at one end to the exhaust system and the other end communicating with the interior of the water receptacle for bleeding a portion of the exhaust gases from the exhaust system into the receptacle to thereby regulate the rate of water vapor injection from the water receptacle to the intake manifold as a function of the output of the engine.

BRIEF DESCRIPTION OF THE DRAWINGS

In order that the invention may be more fully comprehended it will now be described, by way of example, with reference to the accompanying drawings in which.

DETAILED DESCRIPTION OF THE INVENTION

Figure 1:
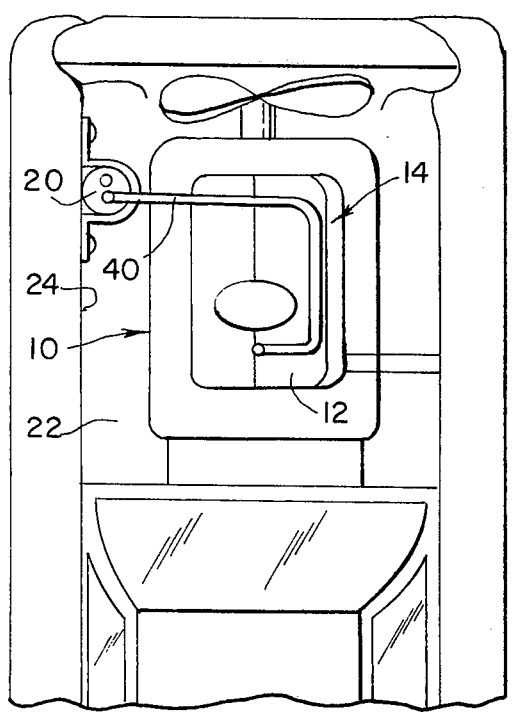
FIG. 1 is a top plan view of an internal combustion engine with the water injection apparatus of the invention incorporated therein.

Referring to the drawings there is shown generally by reference numeral 10 an internal combustion engine of conventional construction except for the water vapor injection system to be described herein. It will be seen that the engine includes an intake manifold 12 which is mounted in relation to the cylinders (not shown) of the engine such that water vapor and a combustible gaseous mixture can be introduced thereinto in order to develop the power output of the engine. An exhaust system is provided for the engine including an exhaust manifold 14, a muffler 16 and tailpipe 18. These are conventional components for an internal combustion engine employed to power an automobile, and the water vapor injection system of the invention will be described in connection with such an engine although it will be apparent that the system has application to internal combustion engines employed in other environments such as the power other types of vehicles and as stationary power plants, A receptacle 20 for the storage of a supply of water is mounted on the automobile in fixed relation to the engine. As shown in FIG. 1, it may be mounted within the engine compartment 22 on an interior wall 24 thereof. However, it will be understood that the water receptacle or reservoir may be mounted in any convenient location.

The receptacle 20 is given an air inlet 26 in the upper portion thereof above the highest level at which a body of water 28 would normally be stored therewithin. A conduit 30 is connected to the air inlet and extends downwardly below the water level so as to conduct air from the air inlet for discharge at a lower level in the receptacle. Such conduit 30 may comprise a flexible hose of any conventional material such as the rubber windshield wiper hose customarily used. A valve 32 may be mounted in the air inlet to prevent the escape of water vapor from the receptacle. A fill cap 34 may also be provided in the top wall 35 of the receptacle for replenishing the supply of water when necessary.

Figure 2:
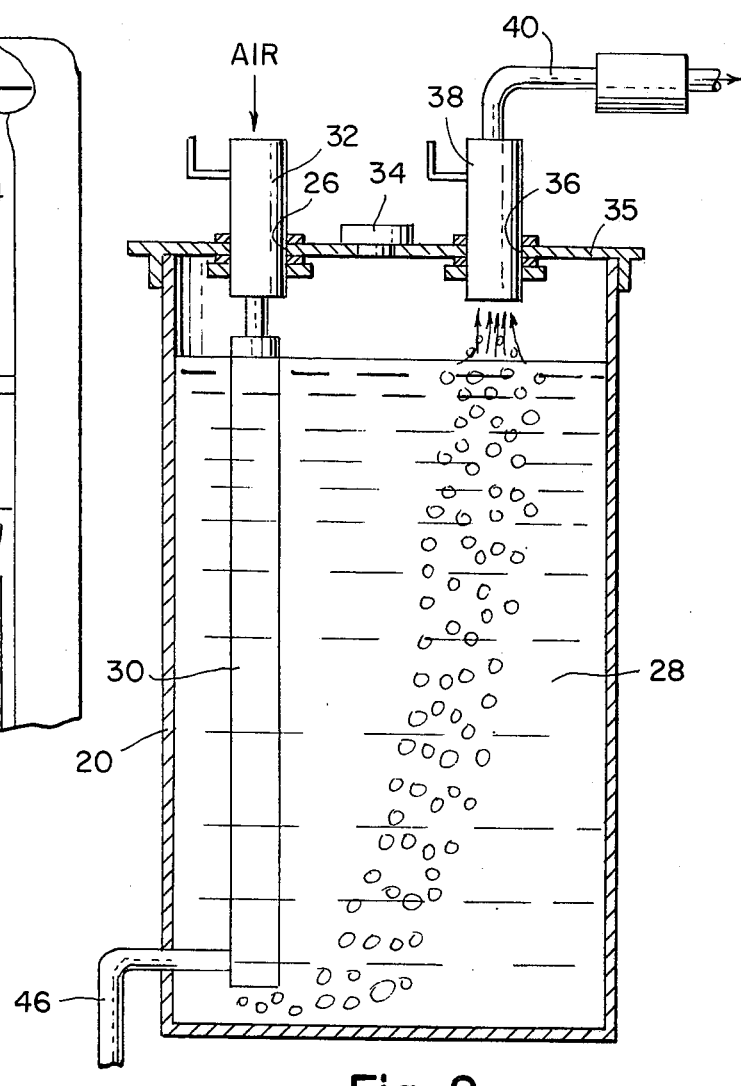
FIG. 2 is a fragmentary side elevational view of a water receptacle, partly in cross-section, showing the conduit arrangement for introducing air and for withdrawing water vapor from the receptacle and one embodiment of water vapor injection regulating means.
Figure 3:
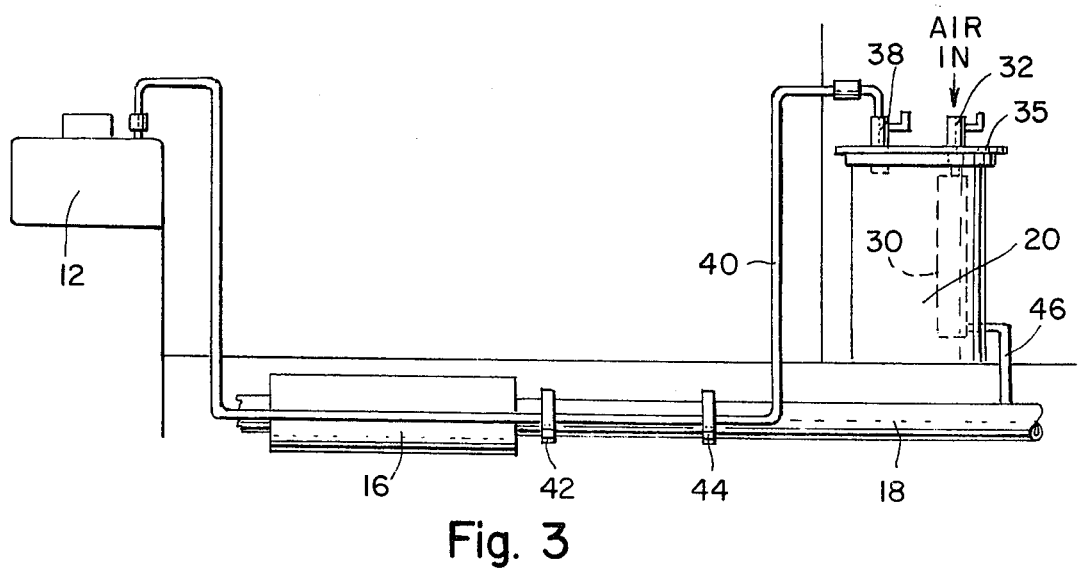
FIG. 3 is a schematic illustration of the water vapor injection system and one means for effecting heat exchange of the water vapor prior to its injection into the internal combustion engine.

The water receptacle is provided with a water vapor output 36 in the region above the water level, and the top wall of the receptacle is a convenient location for such outlet. As shown in FIG. 2 valve 38 similar to valve 32 may be positioned in the vapor outlet and may be set to prevent the escape of water vapor until a predetermined vacuum is established in the intake manifold. However, it is possible to omit valve 38 and still have an operative system. A conduit 40 is connected in outlet 36 and at the other end thereof is connected to intake manifold 12. Desirably, and as shown in FIG. 3, at least a portion of the conduit extends in heat exchange relationship with the exhaust system so as to preheat the water vapor before being introduced into the intake manifold. FIG. 3 thus shows the conduit 40 as being clamped to the tail pipe of the exhaust system by means of clamps 42, 44 and passing in heat exchange relation with such portion of the exhaust pipe and with muffler 16.

Also, in accordance with the water vapor injection system of the invention, a conduit 46 is provided to tap off a portion of the exhaust gas for passage to water receptacle 20. Desirably the conduit 46 terminates adjacent the discharge end of the air inlet conduit 30 such that the flow of air from the air conduit is influenced in accord with changes in the rate of exhaust gas being discharged and thereby directly with changes in engine speed. Even in such instances where the discharge of air is not affected the exhaust gas bubbles through the water in the receptacle to produce additional water vapor for introduction into conduit 40 and thence to the intake manifold. Thus, at increased engine speeds when additional water vapor injection would be desirable it is produced in receptacle 20. FIG. 2 illustrates a preferred construction for the end of conduit 46 where, as shown, conduit 46 extends into the discharge end of the air inlet conduit 30 and tends to aspirate air therefrom under conditions when it is needed.

It will, of course, be appreciated that where desired a conventional spray nozzle may be connected to the end of conduit 40 within the intake manifold to provide for a spraying of the water into the intake manifold.

From the foregoing it will be seen that a water vapor injection system has been provided which effects the introduction of water vapor into an internal combustion engine at a point where maximum utilization of the water vapor can be achieved and under controlled conditions whereby the rate of introduction varies directly with engine speed fluctuations.

I claim:

1. Apparatus for injecting controlled amounts of water vapor into an internal combustion engine comprising in combination:

an internal combustion engine including an intake manifold for the introduction of a combustible gaseous mixture into the cylinders of said engine and an exhaust system for the discharge of combusted gases from said engine;

a receptacle for storing a supply of liquid water in fixed relation to said engine;

an air inlet in the upper portion of said water receptacle and first conduit means connected thereto having its air discharge end terminating at a lower level within said receptacle;

an outlet for water vapor in the upper portion of said water receptacle and second conduit means connected at one end thereto and at the other end to said intake manifold for withdrawing water vapor from said receptacle and for conducting same to said intake manifold by virtue of the suction forces created in said intake manifold;

and third conduit means connected at one end to said exhaust system and the other end extending into the discharge end of said first conduit for aspirating air from said air conduit in direct relation to the power output of the engine.

2. Water injection apparatus according to claim 1, wherein said second conduit means extends for at least a portion of its length in heat exchange relation with said exhaust system so as to heat the water vapor being conducted to said intake manifold.

3. Water injection apparatus according to claim 2, wherein said second conduit means is in heat exchange relation with the muffler and tail pipe of said exhaust system.

* * * * *